3,325,565
MIXED MONOALKYL AND DIALKYL ESTERS OF PHOSPHORIC ACID PARTIALLY NEUTRALIZED WITH A PRIMARY ALKYL AMINE
Alexander H. Popkin, Maplewood, N.J., assignor to Esso Research and Engineering Company, a corporation of Delaware
No Drawing. Filed Oct. 1, 1963, Ser. No. 312,859
4 Claims. (Cl. 260—925)

This invention concerns a new composition of matter and a process for making the same, and more particularly, concerns a multipurpose gasoline additive which forms a synergistic anti-icing combination with isopropyl alcohol without causing the formation of harmful zinc precipitates.

The problem of carburetor icing and the engine power losses and engine stalling which result therefrom is not a new one. Operators of automotive, aviation, marine and stationary gasoline engines, particularly those in the colder areas of the United States, have long been familiar with the problem. Tests and surveys have shown that most engines are subject to carburetor icing when the atmospheric temperature drops below about 50° F. and when the relative humidity is in excess of about 75%. Such icing is not confined to any particular type of engine or to any particular type of carburetor. When a gasoline engine is first started, the carburetor is immediately chilled to a temperature considerably below the atmospheric temperature due to the refrigeration effect of the vaporization of the gasoline. This reduced carburetor temperature, often as much as 50° F. below the atmospheric temperature, persists beyond the warmup period of the rest of the engine because of the external position of the carburetor and the poor heat transfer to it. On a humid day, moisture in the air entering the carburetor condenses and freezes on the throttle plate and the carburetor walls adjacent thereto. Such freezing occurs most readily during conditions of light load operation. When the throttle is closed to the idle position, ice which is formed on the throttle plate and adjacent carburetor walls plus ice which then forms restricts the flow of air to the engine. The result is the loss of engine power and frequently the engine stalls. The problem is particularly aggravated in the case of engines equipped with carburetors having venturi diameters on the order of 21 millimeters or less and is also more severe in engines having the venturi tube insulated from the carburetor body. Many gasoline engines are equipped with carburetors having these features.

Another factor which has made the problem of carburetor icing more serious in recent years is the volatility of the gasolines now marketed. Tests have shown that a wholly hydrocarbon fuel having an ASTM 50% distillation point by method D-86 above about 310° F. is not subject to stalling during warmup. Present day fuels are considerably more volatile than this. ASTM specifications now permit a maximum 50% distillation point of 284° and most commercial gasolines have 50% distillation point substantially below this maximum. These highly volatile modern gasolines give rise to carburetor icing and stalling difficulties much more frequently than the older, less volatile fuels.

Another problem which has long existed in the handling and use of gasoline is the rusting which frequently occurs in pipelnes, storage tanks, engines, etc. Rusting of equipment in which petroleum products are stored and used occurs as the result of traces of moisture inevitably present in petroleum distillates. Moisture finds its way into the distillates in a variety of ways. Although water is not appreciably soluble in petroleum distillates, traces of moisture are, in fact, dissolved therein principally from the absorption of atmospheric moisture.

A variety of phosphorus compounds are known to the art for their sundry functions in gasoline; for example, in copending application S.N. 209,414, filed July 12, 1962, the instant inventor has described and claimed an amine salt of mono- and dialkyl esters of phosphoric acid. The amine is reacted in stoichiometric amounts in order to form a fully neutralized salt. This product, an effective multipurpose gasoline additive, is an antirust agent, a carburetor detergent and deposit modifier.

However, this additive causes excessive amounts of zinc precipitates to be formed under some circumstances. This occurs when the additive is used in combination with the anti-icing agent, isopropyl alcohol, where the gasoline has contacted certain slightly alkaline refinery bottoms. This generally occurs where the concentration of the fully neutralized salt is about 40 pounds/1000 barrels and the concentration of isopropyl alcohol is about 2 or 3%. The formation of the zinc precipitates is undesirable for many reasons, one being that the precipitates cause filter plugging which results in engine stalling.

It has now been discovered that the formation of zinc precipitates can be greatly reduced by using a partially neutralized composition of mono- and dialkyl esters of phosphoric acid rather than the fully neutralized salt. Moreover, the partially neutralized composition of this invention enhances the anti-icing efficacy of additives like isopropyl alcohol. These advantages are obtained without significantly sacrificing the detergency and antirust efficacy of the fully neutralized salt.

The additives of this invention are obtained by partially neutralizing a mixture of mono- and dialkyl esters of phosphoric acid with an amine.

Effective amines include $C_1$ to $C_5$ primary alkylamines. The alkyl groups may be branched but preferably have straight chains. The preferred amine is n-butylamine. It is preferred that the alkyl group is unsubstituted; however, for some purposes it may be desirable to have substituted groups, such as hydroxy or halogen. In the reaction, the amine should be employed in an amount of from 30 to 70%, preefrably 40 to 60%, of the stoichiometric amount necessary to fully neutralize the mixture of mono- and dialkyl esters. The most preferred additive composition is made using 50% of the stoichiometric amount.

The mono- and diesters have from 12 to 20 carbon atoms in each alkyl group. The alkyl groups may be branched and, in some instances, substituted but preferably are unsubstituted and have straight chains. The preferred esters contain 13 carbon atoms and are prepared by reacting a $C_{13}$ oxo alcohol with $P_2O_5$. Such esterification reactions are described in copending application S.N. 209,414. The following example illustrates the preferred method of preparing the mixture of mono- and dialkyl esters of phosphoric acid.

EXAMPLE 1

A 1,000 gallon reactor was charged with 1,176 pounds of a $C_{13}$ oxo alcohol and 278 pounds of $P_2O_5$. A temperature of about 165° F. was maintained for about 19 hours; a nitrogen atmosphere was maintained in the reactor. The final product consisted of equimolar amounts of the mono- and diester.

The $C_{13}$ oxo alcohol used in the preparation of the preferred mono- and diesters is prepared by the oxonation and subsequent hydrogenation of a $C_{12}$ olefin. The hydrogenation reaction should be performed in the presence of a suitable catalyst, e.g., cobalt on a suitable support.

The mixed esters to be neutralized with an amine should be in a ratio in the range of from 25/75 to 75/25 mole ratio of monoester to diester. The preferred mixture contains equimolar quantities of the monoester and diester. The following example illustrates a method of preparing the preferred additive composition of this invention.

EXAMPLE 2

A reactor was charged with 1620 grams of the equimolar mixture of mono- and diester prepared in Example 1. Kerosene (755 grams) was added to the mixture, a nitrogen blanket was applied, and about 174 grams (50% stoichiometric amount) of n-butylamine were added over a period of one hour. The reaction mixture was maintained at a temperature of 250° F. for 4 hours.

The reaction temperature of the neutralization reaction may vary within the range of from about 220° F. to 350° F., but is preferably in the range of from about 245° F. to 255° F. The reactants must be maintained at this temperature for a period of at least one hour, preferably for 3 to 18 hours.

The partially neutralized mono- and diester composition described herein is a novel composition. It obviously differs from the fully neutralized salt and has advantages thereover as described above. The composition also differs from additive mixtures prepared by partially neutralizing a monoester and diester individually and thereafter combining the individually neutralized esters. This was evidenced by tests showing the instant composition to be superior to the individually neutralized esters with regard to zinc precipitate formation in the presence of selected refinery bottoms.

This additive composition has good antirust properties, gives good carburetor detergency, and has combustion chamber deposit modification benefits. It is effective in gasoline in concentrations of from 8 p.p.m. (2 pounds/1000 barrels) to 320 p.p.m. (80 pounds/1000 barrels). It forms a synergistic anti-icing combination with isopropyl alcohol where the alcohol is employed in concentrations of from 0.3 to 4.0 vol. percent. When used in combination, the preferred concentrations are from 50 p.p.m. to 100 p.p.m. of the partially neutralized ester composition and from 0.5 to 3.0 vol. percent of isopropyl alcohol. A particularly desirable anti-icing composition comprises the instant additive and isopropyl alcohol in combination with hexylene glycol in a concentration of from 5 to 80 pounds/1000 barrels, preferably 12½ to 30 pounds/1000 barrels of the additives of this invention, 0.5 to 3.0 vol. percent isopropyl alcohol and preferably 1.0 to 1.5% and 0.02 to 0.35 vol. percent, preferably 0.05 to 0.1 vol. percent hexylene glycol. Another effective combination comprises 5 to 80 pounds/1000 barrels, preferably 12½ to 30 pounds/1000 barrels of the additives of this invention, and 0.02 to 0.35 vol. percent, preferably 0.1 to 0.25 vol. percent hexylene glycol.

Gasolines, as contemplated for use in accordance with the present invention, have been defined broadly by the American Society for Testing Materials as "complex mixtures composed almost entirely of relatively volatile hydrocarbons which vary widely in their chemical and physical properties." Such gasolines are derived from petroleum by a variety of refining processes including fractional distillation, catalytic cracking, hydroforming alkylation, polymerization, solvent extraction and the like. They include aromatics, naphthenes, olefins, paraffins and sometimes diolefins. They may be used as fuels for aviation engines, marine engines and stationary engines. Gasoline normally boils between about 80° F. and about 450° F. when tested by ASTM method D–86. Its vapor pressure by ASTM method D-323 varies from about 6 to about 15 pounds/square inch or higher at 100° F., depending upon the particular season of the year during which it is to be used. The additive materials of the invention are of particular application to gasolines having vapor pressures in the upper part of this range, i.e., between 9 and 15 pounds/square inch. The gasolines in which the additive materials of the invention are used may have octane ratings ranging from about 83 up to about 104 or higher. Such gasolines normally contain at least 2 cc. of tetraethyl lead/gallon and a halohydrocarbon scavenger agent in concentrations of about 1.0 to 2.0 theories.

The gasolines in which the additive materials of the invention are incorporated may also contain other additive materials. Examples of such additive materials include solvent oils consisting of hydrocarbon mixtures having a Saybolt viscosity at 100° F. not above 450 seconds, a 50% distillation point above about 350° F. at 10 millimeters of mercury pressure, and an API gravity between about 18 and 28°; corrosion inhibitors such as Santolene C, which is a phosphorus-containing dimer of linoleic acid; gum inhibitors, such as N,N'-disecondary butyl p-phenylene diamine, 2,4-dimethyl-6-tertiary butyl phenol and 2,6-ditertiary butyl-4-methylphenol; dyes, such as 1,4-diisopropyl aminoanthraquinone and p-dimethyl aminoazobenzene; dye stabilizers, such as ethylene diamine; and similar additive materials commonly used in gasolines. The gasolines of the invention will, however, comprise at least 95% by weight of hydrocarbons.

In summary, the instant additive composition prepared by neutralizing a mixture of mono- and dialkyl ester of phosphoric acid with from 30 to 70% of the stoichiometric amount of a $C_1$ to $C_5$ primary amine is a multipurpose additive which is superior to the fully neutralized salt in that it forms a synergistic anti-icing combination with isopropyl alcohol and does not induce the formation of excessive zinc precipitates in the presence of the anti-icing agent isopropyl alcohol.

It is believed that the formation of a zinc salt of phosphoric acid is occasioned by the galvanic action of a zinc-steel couple in zinc-lined storage containers and pipes. The action is induced by some slightly alkaline water bottoms which commonly come into contact with gasoline. The following example shows the superiority of the instant additive composition as compared with the fully neutralized salt.

EXAMPLE 3

A salt was prepared by fully neutralizing a portion of the additive mixture described in Example 1 with n-butylamine. The salt was compared with the additive of this invention described in Example 2.

Two test blends were prepared for comparison:

*Blend 1*

| | |
|---|---|
| Gasoline _____ gallons__ | 5 |
| Fully neutralized salt _____ pounds/M b__ | 40 |
| Isopropyl alcohol _____ percent__ | 2.3 |

*Blend 2*

| | |
|---|---|
| Gasoline _____ gallons__ | 5 |
| Partially neutralized composition (see Example 2) _____ pounds/M b__ | 40 |
| Isopropyl alcohol _____ percent__ | 2.3 |

Each blend was then stirred with 0.5 vol. percent slightly alkaline refinery bottoms for one-half hour at 165 r.p.m. in a stainless steel tank fitted with a zinc-1010 steel couple. Each blend was then allowed to age without stirring for 23½ hours, and was then pumped at 175 ml./min. through a 12.6 cm. 10μ AC Filter while being stirred at 100 r.p.m. A pressure drop of 5.4 inches of Hg constitutes essentially complete plugging. The results appear in the following table.

TABLE I

| | ΔΔP (inches Hg) |
|---|---|
| Blend #1 _____ | 4.4 |
| Blend #2 _____ | 0.5 |
| Gasoline containing only isopropanol _____ | 1.0 |

It is seen that the additive composition essentially obviates the problem of zinc precipitation occasioned by the use of the fully neutralized salt.

The following example illustrates that the additives of this invention enhance the anti-icing efficacy of isopropyl alcohol.

EXAMPLE 4

Gasoline samples were prepared containing various concentrations of the additive composition described in Example 2 and isopropyl alcohol. These samples were then tested in a 1956 Plymouth engine by starting the engine, operating it for a period of 30 seconds at 1500 revolutions/minute, and then permitting the engine to idle for 15 seconds. This procedure was repeated until smooth operation was obtained, the engine being cold at the beginning of each test series. The number of stalls which occurred in each series of tests was noted and taken as an indication of the carburetor icing characteristics of the fuel being tested. The data were obtained at an atmospheric temperature of 40° F. and at 100% relative humidity. The results of this test are shown in Table II.

Carburetor icing numbers as presented in Table II were also determined. Carburetor icing number is a means for rating the performance of anti-icing additives. A rating of 100 means there were no stalls, whereas a rating of 0 designates a condition of maximum stalling.

TABLE II

|  | Number of Standard Stalls [2] | Carburetor Icing Number [2] |
|---|---|---|
| Base gasoline [1] | 10 | 0 |
| 1.0% isopropyl alcohol | 4½ | 55 |
| 25 pounds/M b. partially neutralized ester | 10 | 0 |
| 1.0% isopropyl alcohol and 25 pounds/M b. partially neutralized ester | 2 | 80 |

[1] 42% off at 158° F., 62% off at 212° F., 91% off at 302° F.
[2] Average of 6–8 tests.

It is seen from the above data that enhanced anti-icing activity is obtained by employing the additives of this invention in combination with isopropyl alcohol.

What is claimed is:

1. A gasoline-soluble mixture of partially neutralized alkyl esters of phosphoric acid, said mixture being the product obtained by reacting a mixture of monoalkyl and dialkyl esters of phosphoric acid with a primary alkyl amine having in the range of 1 to 5 carbon atoms, the amount of said amine being in the range of from about 30 to 70 percent of the stoichiometric amount needed for complete neutralization of said esters, the alkyl group in said ester having in the range of from 12 to 20 carbon atoms, the mole ratio of monoester to diester in said mixture of esters being in the range of from 25/75 to 75/25.

2. A gasoline-soluble mixture of partially neutralized esters as defined by claim 1 wherein said primary alkyl amine is n-butyl amine.

3. A gasoline-soluble mixture of partially neutralized esters as defined by claim 1 wherein said monoesters and diesters are esters of $C_{13}$ oxo alcohols.

4. A gasoline-soluble mixture of partially neutralized esters as defined by claim 1 wherein the partially neutralized ester is the product of neutralizing about equimolar amounts of said monoester and diester with about 50 percent of the stoichiometric amount of said amine.

References Cited

UNITED STATES PATENTS 2,656,372   10/1953   Ernst et al. _____ 260—925
2,863,904   12/1958   Cantrell et al. _____ 260—925
3,080,222   3/1963    Cantrell et al. _____ 260—925 X CHARLES B. PARKER, *Primary Examiner.*

F. M. SIKORA, A. H. SUTTO, *Assistant Examiners.*